March 11, 1969 M. I. GLASS ET AL 3,432,230

AUDIO-VISUAL UNIT

Filed June 15, 1966

INVENTOR.
MARVIN I. GLASS
GUNARS LICITIS

BY Soco & Coffee

ATTORNEYS 3,432,230

AUDIO-VISUAL UNIT

Marvin I. Glass, Chicago, and Gunars Licitis, Lombard, Ill., assignors to Marvin Glass & Associates, Chicago, Ill., a partnership Filed June 15, 1966, Ser. No. 558,223
U.S. Cl. 353—120 6 Claims
Int. Cl. G03b *31/00, 31/06, 31/04*

The present invention relates to an audio-visual element, and is particularly directed to a combined sound record and stereoscopic transparency holder.

Stereoscopic viewers are well known, particularly the modern form of such devices which provide for the viewing of films or transparencies. One of the more popular forms of such viewers utilizes a circular disc or holder which has the transparencies or films arranged adjacent the periphery of the holder. One such device is shown in U.S. Patent No. 2,511,334. A recent development with respect to the described form of transparency viewer includes a sound reproducing mechanism which cooperates with the viewer to provide audible messages, each appropriate to the picture being viewed. This viewer with sound is the subject matter of a co-pending patent application, which is assigned to the assignee of the present application.

The primary object of the present invention is to provide a novel combination of sound reproducing element and picture holder. A further object of the invention is to provide a novel form of combined transparency holder and sound record. A more detailed object is to provide a circular transparency holder, wherein the transparencies are arranged in diametrically opposite positions adjacent the periphery of the holder, with a relatively rotatable record disposed co-axially with the holder and having its outer edge portion at least partially overlying the transparencies. Other objects and advantages will be apparent from the following description of the selected embodiment of the invention, as illustrated in the drawings, wherein:

Figures 1, 2, 3, 4:
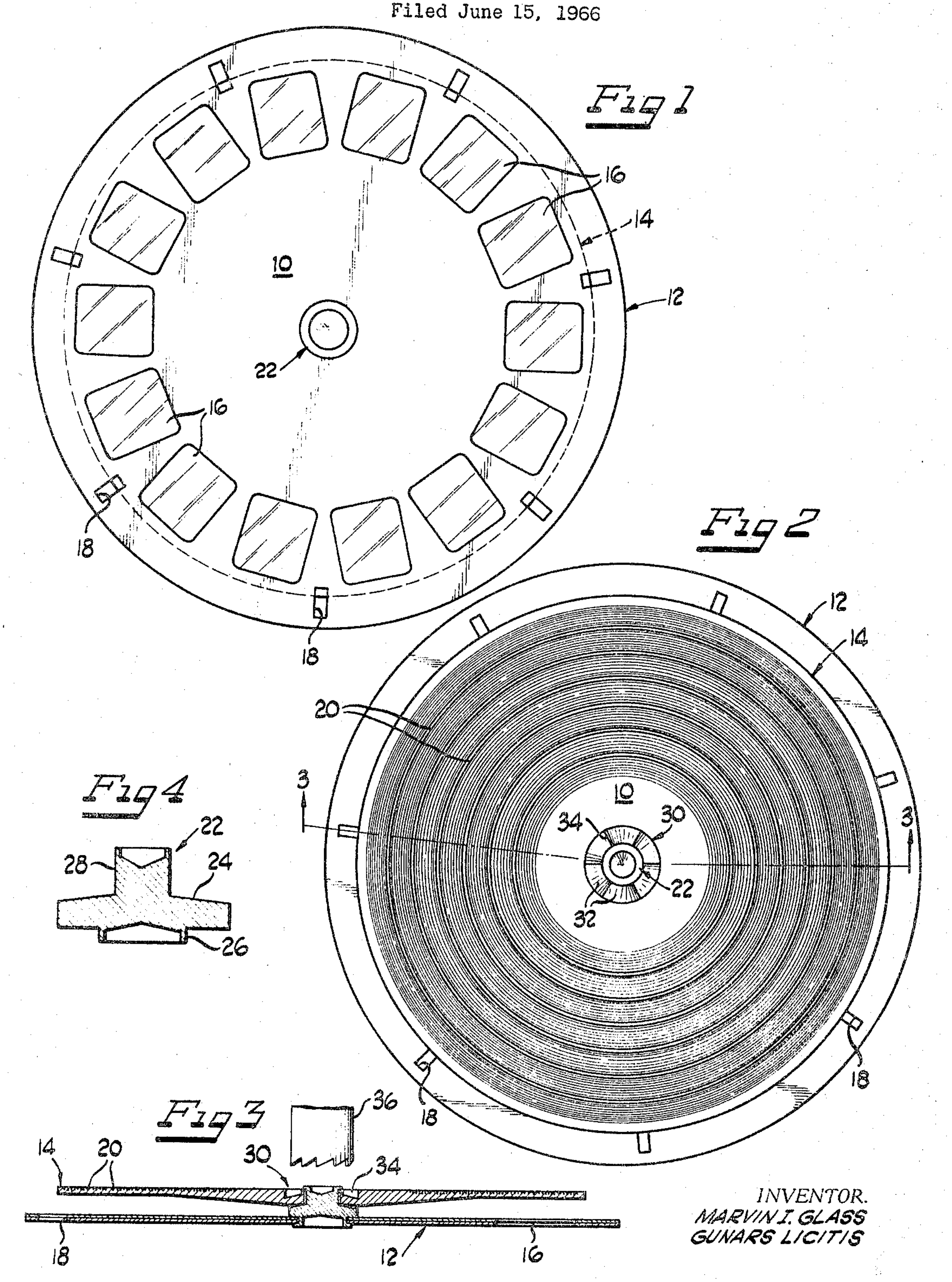
FIGURE 1 is an elevational view of the transparency holder and record, taken from the transparency holder side of the unit.
FIGURE 2 is an elevational view of the transparency holder and record unit, taken from the side opposite that seen in FIGURE 1 and particularly illustrating the record portion of the unit.
FIGURE 3 is a sectional view taken along the line 3—3 in FIGURE 2.
FIGURE 4 is a cross-sectional view of the fastening means used in securing the transparency holder and record together.

The selected embodiment comprises an audio-visual device 10 including a circular transparency holder 12 and a record 14 mounted on the holder for relative rotation. The transparency holder 12 is preferably a lamination of paper and aluminum, with the paper covering the opposite faces of the disc. Mounted in openings formed in the disc are a plurality of pairs of film transparencies 16, with the pictures of each pair being disposed in diametrical alignment at opposite edges of the disc 12 to provide a stereoscopic view of the picture, in a manner which is well known in the art. The peripheral or marginal portion of the disc includes small slotted openings 18 which are adapted to be engaged by a rotatable drive plate (not shown) in the viewer for moving the pairs of pictures sequentially into view, as by means such as is disclosed in U.S. Patent No. 2,511,334.

The sound reproducing element or record 14 is circular and of plastic or other suitable material. In the illustrated embodiment, the record has cut thereon a plurality of individual messages, each of which is particularly pertinent to the subject matter of one of the pairs of transparencies, and such messages are arranged in the same sequence as the pictures on the transparency holder. The individual messages are preferably separated by continuous grooves 20, so as to prevent the travel of the needle on the record beyond the message which is pertinent to the picture being viewed. Further, the record is made of translucent material, such as clear vinyl, in order to permit the passage of light through the record as well as through the underlying transparencies. In one audio-visual device, which has been designed for use with the subject matter of the present application, an acoustical type of sound reproducing mechanism is utilized, and for such device a vertically modulated record is preferred. However, it is contemplated that a more elaborate and electronic form of sound reproducing mechanism might be used in conjunction with the present invention and, in such instance, a laterally modulated record may be used.

The center of the record 14 is rotatably secured in co-axial relation with the holder or disc 12 by a fastening element 22 which is preferably generally in the form of a rivet having a center bearing portion 24. The fastener is originally formed as shown in FIGURE 4, and during the assembly of the transparency holder and record, the fastener 22 is positioned with one end portion 26 through a center opening of the disc 12 and the other end portion 28 through a center opening in the record 14, with the disc and record being separated by the circular bearing portion 24. The rivet is then upset at its opposite ends to provide flanged portions of sufficient diameter to hold the disc and record together, with the record being loosely mounted and easily rotatable relative to the fastener. In the latter respect, the circular center portion 24 of the fastening element provides a bearing surface for rotation of the record.

The uncut center portion of the record is provided with a drive hub 30 which is preferably stamped or otherwise formed in the record material and which comprises a plurality of arcuate segments 32 arranged about the rivet, each of which is similarly inclined in a direction circumferentially of the center axis of the record. These inclined surface portions present a generally vertical wall 34 which is adapted to cooperate with complementary sections on the free end of a motor driven hub portion of the sound reproducing mechanism, indicated generally at 36. As the driving hub 36 moves into engagement with the center hub 30 of the record, the vertical faces thereon engage the vertical edges 34 of the arcuate segments 32 on the record to provide a one-way driving relation therebetween. While other forms of drive means might be provided to effect rotation of the record relative to the disc, the described arrangement is particularly effective in coupling the driving hub of a sound reproducing mechanism with the center of the record while such driving hub is rotating and without particular regard to precise axial alignment between the record and the driving hub. In this latter respect, the driving hub 36 preferably has a diameter somewhat smaller than the maximum or outside diameter of the center hub portion 30 of the record engaged thereby to facilitate engagement of the two.

Thus it is seen that there is provided an integral audio-visual element, which physically unites the visual reproductions or transparencies with the audio message in a manner affording passage of light through the transparencies while achieving maximum usage of the audio portion or record for accompanying messages or sounds. Further, since the pictures and sound record are permanently secured together and occupy an area no greater than that required for the picture holder alone, the matter of packaging and storage is simplified, and there is no problem with respect to separation of the two complementary units.

Although shown and described with respect to particular structure, it will be apparent that various modifications might be made without departing from the principles of this invention.

What is claimed is:

1. An audio-visual unit comprising a substantially plane frame structure having an opening area supporting a photographic transparency, and a sound record mounted on said frame structure for rotation relative thereto, said sound record being of translucent material and extending at least partially over the photographic transparency.

2. An audio-visual unit comprising a generally circular, planar frame structure having a plurality of openings adjacent the outer portion thereof, each of the openings supporting a photographic transparency, a sound record mounted on said frame structure in generally coaxial relation thereto and for rotation relative to said frame structure, said sound record being of translucent material and having a diameter sufficiently great to cause a portion of the record to at least partially overlie the photographic transparencies.

3. An audio-visual unit as set forth in claim 2, wherein said sound record is provided at its center portion with a frictional drive surface.

4. An audio-visual unit for a stereoscopic viewer comprising a generally planar disc including openings therethrough mounting a plurality of pairs of photographic transparencies adjacent the outer circumferential portion of said disc, a circular sound record, and means securing said sound record and disc in substantially coaxial relation with said record being freely rotatable relative to said disc, said sound record having its outer edge portion disposed in overlying relation to said photographic transparencies, at least said outer edge portion of said record being formed of translucent material whereby light required for viewing said transparencies can also pass through said record.

5. An audio-visual unit in accordance with claim 4, wherein said record is provided with an annular driving means surrounding its center axis, said annular driving means comprising a series of similarly inclined, arcuate segments presenting spaced-apart, generally vertical surfaces around the center of the record.

6. An audio-visual unit in accordance with claim 4, wherein said sound record and said disc are each provided with an opening at the center thereof, and the means securing the record and disc together comprises a rivet-like element having one end in engagement with said disc, the other end of said element providing a pivot mounting for said record, and an intermediate portion of said element forming a spacer and bearing surface between the record and the disc.

References Cited

UNITED STATES PATENTS

| | | | |
|---|---|---|---|
| 1,913,913 | 6/1933 | Boularan | 352—26 |
| 1,933,057 | 10/1933 | Harkin | 352—26 |
| 2,005,914 | 6/1935 | Freund | 352—26 |
| 2,847,905 | 8/1958 | Novak | 88—28 X |
| 3,145,616 | 8/1964 | Schwartz et al. | 88—28 |

NORTON ANSHER, *Primary Examiner.*

RICHARD M. SHEER, *Assistant Examiner.*

U.S. Cl. X.R.

40—70; 350—120; 352—31, 37; 353—7, 16, 19